United States Patent
Klein et al.

(10) Patent No.: US 9,191,274 B2
(45) Date of Patent: Nov. 17, 2015

(54) PUSH BUTTON CONFIGURATION OF DEVICES

(71) Applicant: Broadcom Corporation, Irvine, CA (US)

(72) Inventors: Philippe Klein, Jerusalem (IL); Avi Kliger, Ramat Gan (IL); Yitshak Ohana, Givat Zeev (IL)

(73) Assignee: BROADCOM CORPORATION, Irvine, CA (US)

( * ) Notice: Subject to any disclaimer, the term of this patent is extended or adjusted under 35 U.S.C. 154(b) by 0 days.

(21) Appl. No.: 14/512,800

(22) Filed: Oct. 13, 2014

(65) Prior Publication Data

US 2015/0033314 A1  Jan. 29, 2015

Related U.S. Application Data

(63) Continuation of application No. 13/171,194, filed on Jun. 28, 2011, now Pat. No. 8,863,249.

(60) Provisional application No. 61/428,840, filed on Dec. 30, 2010.

(51) Int. Cl.
*H04L 12/24* (2006.01)
*H04L 12/28* (2006.01)
(Continued)

(52) U.S. Cl.
CPC ............ *H04L 41/08* (2013.01); *H04L 12/2801* (2013.01); *H04L 12/2803* (2013.01); *H04L 63/08* (2013.01); *H04L 63/083* (2013.01); *H04L 63/162* (2013.01); *H04L 65/4076* (2013.01); *H04N 7/102* (2013.01)

(58) Field of Classification Search
None
See application file for complete search history.

(56) References Cited

U.S. PATENT DOCUMENTS

| 2005/0144468 A1 | 6/2005 | Northcutt et al. |
| 2006/0041749 A1* | 2/2006 | Ptasinki et al. ............... 713/168 |
| 2008/0189431 A1 | 8/2008 | Hyslop et al. |

(Continued)

FOREIGN PATENT DOCUMENTS

| CN | 1298620 A | 6/2001 |
| WO | WO-99/44387 | 9/1999 |

OTHER PUBLICATIONS

Office Action mailed Sep. 5, 2014 in CN Application No. 201110455942.5, 8 pages including English language summary.

(Continued)

*Primary Examiner* — Jung Kim
*Assistant Examiner* — Tri Tran
(74) *Attorney, Agent, or Firm* — Foley & Lardner LLP (57) ABSTRACT

Systems and methods for push button configuration of devices are provided. One system comprises one or more circuits configured to determine that a configuration button on the second device has been activated and determine whether a configuration button has been activated on a first device or a third device within a time interval from a time at which the button on the second device is activated. The circuits are configured to, in response to determining that the configuration button has been activated on either the first device or the third device within the time interval, allow the second device to be authenticated. The circuits are configured to, in response to determining that the configuration button has not been activated on either the first device or the third device within the time interval, prevent admission of the second device. The network may be a wired network, such as a MoCA network.

18 Claims, 9 Drawing Sheets

(51) Int. Cl.
*H04L 29/06* (2006.01)
*H04N 7/10* (2006.01)

(56) References Cited

U.S. PATENT DOCUMENTS

2010/0180112 A1    7/2010  Liu et al.
2011/0173435 A1*   7/2011  Liu et al. ................. 713/150

OTHER PUBLICATIONS

Office Action mailed Mar. 30, 2015 in CN Application No. 201110455942.5, 8 pages including English language summary.

WI-FI Alliance, Wi-Fi Protected Setup Specification, Version 1.0h, dated Dec. 2006, 110 pages.

European Search Report in co-pending, related European Application No. 11009741.7, mailed Feb. 25, 2013.

Notice of Allowance for U.S. Appl. No. 13/171,194 mailed Jun. 11, 2014.

Non-Final Office Action for U.S. Appl. No. 13/171,194 mailed Dec. 17, 2013.

Office Action for Chinese Patent Application No. 201110455942.5, dated Sep. 6, 2015, 7 pages.

* cited by examiner

PUSH BUTTON CONFIGURATION OF DEVICES

CROSS REFERENCE TO RELATED APPLICATIONS

This application is a continuation of and claims priority to and the benefit of U.S. patent application Ser. No. 13/171,194, titled "Push Button Configuration of Multimedia over Coax Alliance (MoCA) Devices," filed Jun. 28, 2011, which claims priority to and the benefit of U.S. Provisional Patent Application No. 61/428,840, titled "Method and System for MoCA Push Button Configuration (PBC)," filed on Dec. 30, 2010, both of which are incorporated herein by reference in their entireties for all purposes.

FIELD OF THE INVENTION

Certain embodiments of the invention relate to networking. More specifically, certain embodiments of the invention relate to a method and system for push button configuration of multimedia over coax alliance (MoCA) devices.

BACKGROUND OF THE INVENTION

Installing networking and multimedia devices into multiple rooms of a house (or other structure) is often very expensive due to the need to rewire the house and the need to purchase multiple devices, such as multiple set-top-boxes and network access points, to accommodate the multi-room installation. Multimedia over Coax Alliance (MoCA) is a standard that seeks to address these problems. MoCA enables connecting devices over the existing coaxial cable that is present in many homes and other structures. MoCA enables distributing multimedia pretty much anywhere in a structure where there is an existing coaxial outlet. MoCA connects devices of various types such as televisions, set-top-boxes, computers, routers, and network access points. MoCA, however, is a relatively new standard that still lacks features that could improve usability.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for push button configuration for multimedia over coax, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for push-button configuration of a MoCA device. A first device coupled to a multimedia over coax alliance (MoCA) network may receive, from a second device via coaxial cabling utilized by the MoCA network, an indication that a configuration button on the second device has been pushed or activated. The first device may receive, from a third device via the coaxial cabling, an indication that a configuration button on the third device has been pushed or activated. The first device may determine whether to allow the second device to be authenticated on the MoCA network based on a particular time interval between when the configuration button of the second device is pushed or activated and when the configuration button of the third device are both pushed or activated. The first device may allow the second device to be authenticated on the MoCA network when the configuration button of the second device and the configuration button of the third device are both pushed or activated within the particular time interval. The first device may prevent the second device from being authenticated on the MoCA network when the configuration button of the second device and the configuration button of the third device are not pushed or activated within the particular time interval. The indication from the third device may comprise a layer 2 management entity (L2ME) message. The indication from the third device may comprise a protocol information element (Protocol IE). The indication from the second device may comprise a discovery request.

After determining to allow the second device to be authenticated, the first device may send a message to the second device, wherein the message may comprise information that enables the second device to determine a privacy password of the MoCA network. The first device may receive, from the second device, a message requesting information indicating whether the MoCA network supports push-button configuration. In response to the received message, the first device may transmit a response to the second device, where the response may indicate whether push-button configuration is supported by the MoCA network.

A network controller of a multimedia over coax alliance (MoCA) network may receive a discovery request from a new node coupled to the MoCA network via coaxial cabling. The discovery request may indicate that a configuration button has been pushed on the new node. The network controller may ignore the discovery request if the push or activation of the button on the new node did not occur within a particular time interval before or after pushing or activation a configuration button on an existing node of the MoCA network. The network controller may transmit a response to the new node if the push or activation of the button on the new node did occur within the particular time interval before or after pushing a configuration button on an existing node of the MoCA network. The response may comprise information enabling the new node to determine a privacy password of the MoCA network. The network controller may receive a layer 2 management entity (L2ME) message or Protocol IE indicating that a configuration button of an existing node of the MoCA network has been pushed.

The network controller may receive, from the new node, a message requesting information indicating whether the MoCA network supports push-button configuration. In response to the received message, the network controller may transmit a response to the new node, wherein the response indicates whether pushbutton configuration is supported by the MoCA network. After transmitting the response to the new node, the network controller may receive a start_admission request from the new node. The start_admission request may have been encrypted utilizing a key generated from what the new node believes to be the privacy password of the MoCA network. The network controller may decrypt the start_admission request utilizing a key generated from the privacy password. If the decryption yields a valid start_admission request, and the start_admission request was received within a determined amount of time of the pushing of the configuration button on the existing node of the MoCA network, then the network controller may admit the new node to the MoCA network. On the other hand, if the new node has the incorrect password, then the key utilized to encrypt the start_admission request will be wrong. Consequently, decryption by the network controller will fail to yield a message that the network controller recognizes as a valid start_admission request.

Figure 1:
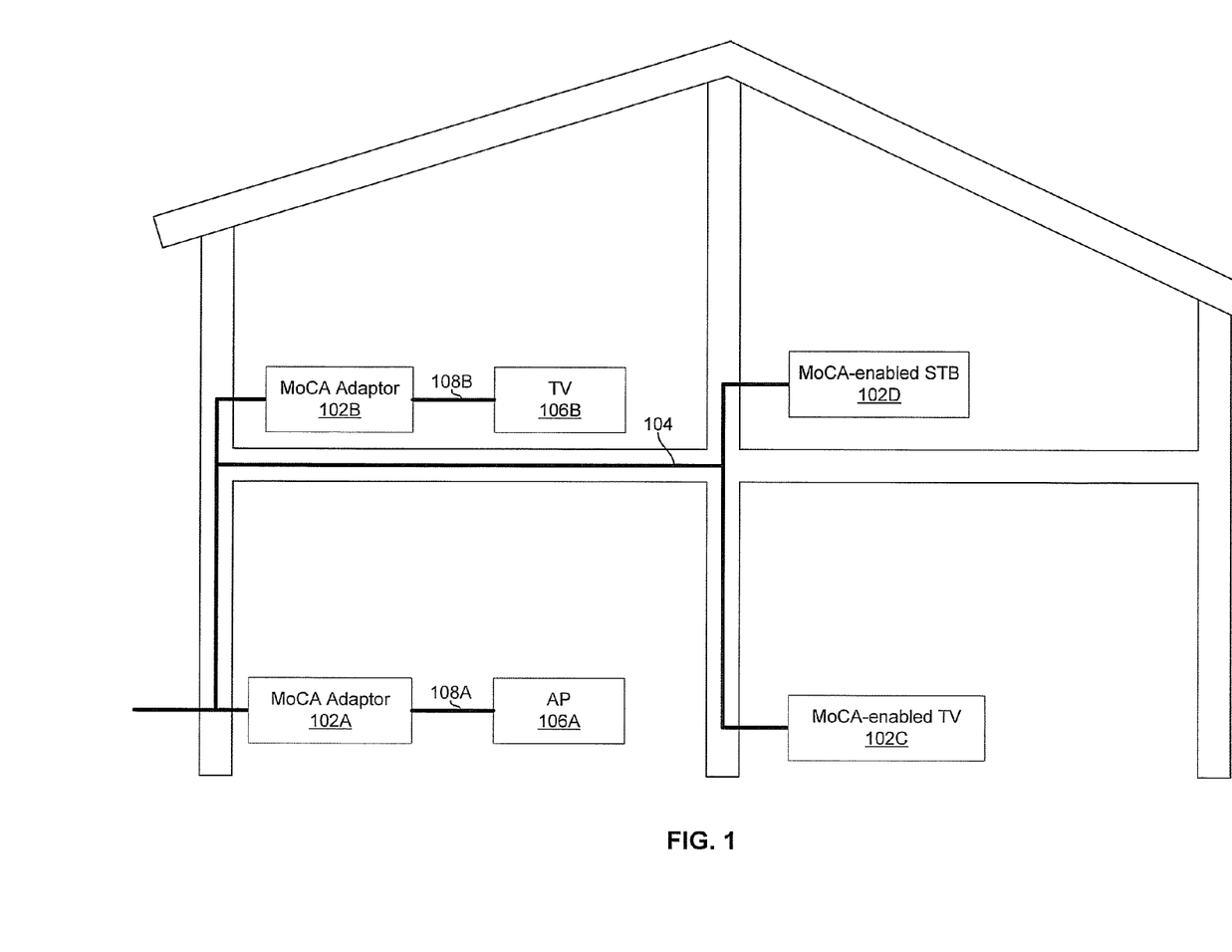
FIG. 1 is a diagram of an exemplary MoCA network, in accordance with an embodiment of the invention.

FIG. 1 is a diagram of an exemplary MoCA network, in accordance with an embodiment of the invention. Referring to FIG. 1, there is shown a plurality of exemplary MoCA devices 102A-102D connected via coaxial cabling 104. Each of the devices may be similar to or the same as the MoCA device 102 described below with respect to FIG. 2.

The MoCA device 102A comprises an adaptor which may enable the access point 106A to communicate over the coaxial cabling 104, in accordance with MoCA standards, via an Ethernet link 108A which may be, for example, an Ethernet-over-coax or Ethernet-over-twisted-pair link.

The MoCA device 102B comprises an adaptor which may enable the television 106B to communicate over coaxial cabling 104, in accordance with MoCA standards, via a point-to-point multimedia cable 108B which may be, for example, an HDMI or DisplayPort cable.

The MoCA device 102C comprises a television which natively supports MoCA. For example, the television 102C may comprise one or more circuits-a chip or chip set, for example—that enables the television 102C to transmit and/or receive packets over the MoCA network. The television 102C may be operable to recover audio, video, control, and/or other data from packets over the MoCA network, and present the data to a viewer of the television 102C. The television 102C may be operable to generate data, packetize the data in accordance with MoCA standards, and communicate the packets over the coaxial cabling 104 in accordance with MoCA standards.

The MoCA device 102D comprises a set-top-box which natively supports MoCA. For example, the set-top-box 102D may comprise one or more circuits comprising a chip or chip set, which enables the set-top-box 102D to transmit and/or receive packets over the MoCA network. The set-top-box 102D may be operable to recover audio, video, control, and/or or other data from packets over the MoCA network, and output the data via, for example, point-to-point audio, video, and/or data connections such as HOMI, OisplayPort, USB, and/or IEEE 1394. The set-top-box 102D may be operable to receive data via one or more point-to-point connections, packetize the data in accordance with MoCA standards, and communicate the packets over the coaxial cabling 104 in accordance with MoCA standards.

In operation, one of the MoCA devices 102A-102D may function as the MoCA network controller ("NC"). Among other functions, the network controller may perform the function of authenticating other devices before they are admitted to the MoCA network residing on the coaxial cabling 104. A MoCA device 102 may be authenticated upon receiving, from the network controller, a discovery response comprising the privacy password of the network. In an embodiment of the invention, the privacy password in the discovery response may be encrypted utilizing a private key of the device 102 such that the device 102 can recover the password by decrypting the encrypted password utilizing a corresponding private key. In another embodiment of the invention, the privacy password in the discovery response may be encrypted utilizing a shared key which each of the device 102 and the network controller may have derived utilizing the other device's public key and its own private key. Aspects of the invention may enable a MoCA device seeking to be authenticated (a "new node" or "NN") to obtain a correct password as a result of two buttons being pressed within a certain amount of time. The first of the two buttons being on the network controller, and the second of the two buttons being on either the network controller or on a previously authenticated node (an "existing node" or "EN").

As utilized herein a "push-button" or "configuration button" may be either physical buttons or may be logical or software buttons accessible via a graphical use interface (GUI). As utilized herein, "pushing" and "pressing" a button may correspond to any method for activating the button such as physically pushing a button and clicking a button on a GUI.

For illustration, an exemplary scenario of push-button configuration of the devices 102A-102D will now be described. The device 102A may be powered up, may be configured to be the network controller. A privacy password may be set-by a network administrator, for example—in the device 102A.

Next, the device 102B may power up. The device 102B may initially be unable to be admitted to the MoCA network on the cabling 104 since it does not have the correct password. A user may then press a button on the device 102B and press a button on the device 102A. Upon both button presses occurring within a time interval having a determined duration, the device 102A may provide information to the device 102B to enable the device 102B to determine the correct password. The device 102B may then be authenticated upon receiving, from the network controller, a discovery response comprising the privacy password of the network. In an embodiment of the invention, the privacy password in the discovery response may be encrypted utilizing a public key of the device 102B. In such an embodiment of the invention, the device 102B may recover the password by decrypting the encrypted password utilizing a private key of the device 102B. In another embodiment of the invention, the privacy password in the discovery response may be encrypted utilizing a shared key which each of the device 102B and the 102A may have derived utilizing the other device's public key and its own private key. In such an embodiment of the invention, the device 102B may recover the password by decrypting the encrypted password utilizing a private key of the device 102B. After being authenticated, the devices 102A and 102B may exchange some messages to admit the device 102B to the MoCA network existing on the coaxial cabling 104. This message exchange may include the device 102B sending a start_admission request that was encrypted utilizing a key generated from the recovered privacy password. Prior to being admitted to the network, the device 102B may be referred to as "new node," and, after being admitted to the network, may be referred to as an "existing node."

Next, the device 102C may be powered on. The device 102C may initially be unable to be admitted to the MoCA network on the cabling 104 since it does not have the correct password. A user may then press a configuration button on either the device 102A or device 102B, and press a configuration button on the device 102C. Upon the button press on either device 102A or 102B being within a determined time interval of the press of the button on device 102C, the device 102A may provide information to the device 102C to enable the device 102C to determine the correct password. The device 102C may be then be authenticated upon receiving, from the network controller; a discovery response comprising the privacy password of the network encrypted utilizing a public key of the device 102C. After being authenticated, the devices 102A and 102C may exchange some messages to admit the device 102C to the MoCA network existing on the coaxial cabling 104. This message exchange may include the device 102C sending a start_admission request encrypted utilizing a key generated from the recovered privacy password. Prior to being admitted to the network, the device 102C may be referred to as "new node," and, after being admitted to the network, may be referred to as an "existing node."

Next, the device 102D may be powered on. The device 102D may initially be unable to be admitted to the MoCA network on the cabling 104 since it does not have the correct password. A user may then press a configuration button on any one of the devices 102A, 102B and 102C, and press a configuration button on the device 102D. Upon the button press one of devices 102A, 102B, and 102C being within a determined time interval of the press of the button on device 102D, the device 102A may provide information to the device 102D to enable the device 102D to determine the correct password. The device 102D may be then authenticated upon receiving, from the network controller, an encrypted discovery response comprising the privacy password of the network. The discovery response may be encrypted utilizing a public key of the device 102D. After being authenticated, the devices 102A and 102D may exchange some messages to admit the device 102C to the MoCA network existing on the coaxial cabling 104. This message exchange may include the device 102D sending a start_admission request that was encrypted utilizing a key generated from the recovered privacy password. Prior to being admitted to the network, the device 102D may be referred to as "new node," and, after being admitted to the network, may be referred to as an "existing node."

Figure 2:
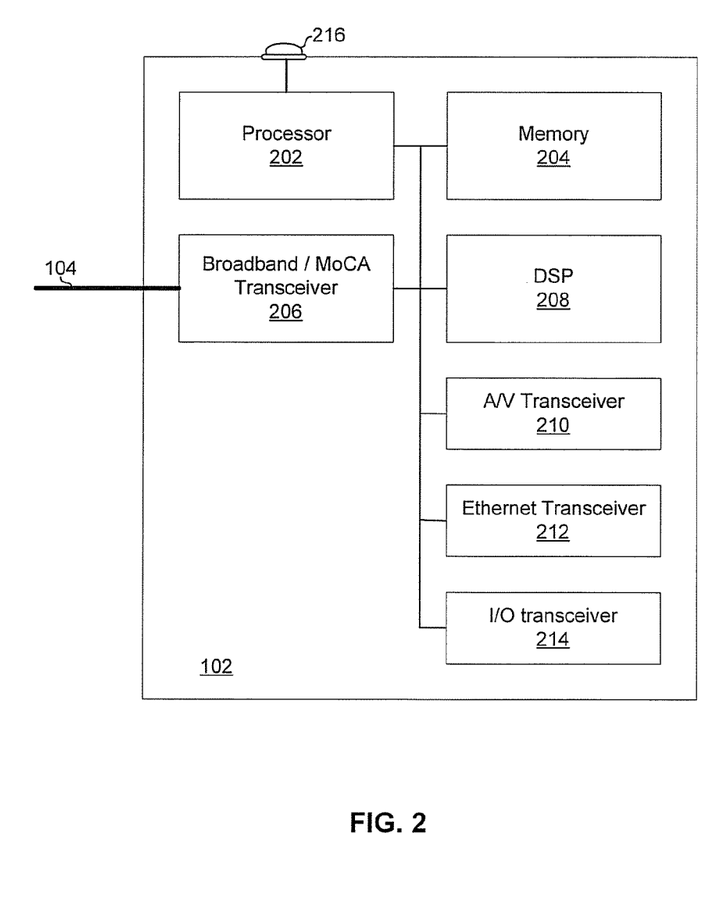
FIG. 2 is diagram of an exemplary MoCA device, in accordance with an embodiment of the invention.

FIG. 2 is diagram of an exemplary MoCA device, in accordance with an embodiment of the invention. Referring to FIG. 2, the MoCA device 102 may comprise a processor 202, a memory 204, a broadband transceiver 206, a digital signal processor (DSP) 208, an audio/video transceiver 210, an Ethernet transceiver 212, an input/output transceiver 214, and a configuration button 216. The MoCA device 102 is only an example for illustration, and other MoCA devices may have different components.

The processor 202 may comprise suitable logic, circuitry, and/or code that may enable processing data and/or controlling operations of the MoCA device 102. The processor 202 may be operable to provide control signals to the various other components of the MoCA device 102. The processor 102 may be operable to control transfers of data between various components of the MoCA device 102. The processor 102 may be operable to execute programs comprising one or more instructions. The programs may, for example, instruct the processor for generating, parsing, transcoding, encrypting, decrypting, or otherwise processing data. The programs may, for example, instruct the processor for configuring or controlling operation of the various components of the MoCA device 102. For example, the instructions may instruct the MoCA device 102 to perform various actions in response to detecting a press of the configuration button 216 and/or in response to receiving a push-button-configuration-related message from a device coupled to the MoCA device 102 via the coaxial cabling 104.

The memory 204 may comprise suitable logic, circuitry, and/or code that may be operable to store information such as instructions to be executed by the processor 202, data generated one or more components of the MoCA device 102, data received via one or more components of the MoCA device 102, and/or parameters for controlling operation of the MoCA device 102. The memory 204 may comprise, for example, SRAM, DRAM, flash memory, and/or magnetic storage. Parameters stored in the memory 204 may comprise, for example, a parameter indicating whether pushbutton-configuration is enabled in the MoCA device 102. The memory 204 may also store public and or private keys for performing encryption and/or decryption and/or determining a MoCA privacy password.

The DSP 208 may comprise suitable logic, circuitry, and/or code operable to perform computationally intensive processing of data. In various embodiments of the invention, the DSP 208 may be operable to encode, decode, transcode, modulate, demodulate, encrypt, decrypt, scramble, descramble, and/or otherwise process data received and/or to be transmitted via one or more of the broadband transceiver 206, the AN transceiver 210, the Ethernet transceiver 212, and the 1/0 transceiver 214.

The broadband transceiver 206 may comprise suitable logic, circuitry, and/or code that may be operable to transmit data in adherence with one or more broadband standards. The broadband transceiver 206 may be operable to perform amplification, down-conversion, filtering, demodulation, and analog to digital conversion of received signals. The broadband transceiver 206 may be operable to perform amplification, up-conversion, filtering, modulation, and digital to analog conversion of transmitted signals. In various exemplary embodiments of the invention, the broadband transceiver 206 may transmit and/or receive data over the coaxial cabling 104, which may be, for example, coupled to a CATV, satellite, and/or IPTV infrastructure. The broadband transceiver may be operable to communicate in accordance with one or more of CATV, satellite, and/or IPTV protocols while concurrently communicating in accordance with MoCA protocols.

The AN transceiver 210 may comprise suitable logic, circuitry, and/or code that may be operable to communicate audio and/or video content in accordance with one or more point-to-point audio and/or video standards. Exemplary standards which may be supported by the AN transceiver 210 comprise analog audio, composite video, analog RGB video, S-Video, component video, DVI, HDMI, and DisplayPort. In this regard, the AN transceiver 210 may be operable to filter, modulate, demodulate, encode, decode, and/or amplify audio and/or video signals.

The Ethernet transceiver 212 may comprise suitable logic, circuitry, and/or code that may be operable to exchange information in accordance with one or more Ethernet standards. The Ethernet transceiver may be operable to communicate over copper, fiber, and/or backplane in accordance with one or more Ethernet physical layer standards.

The I/O transceiver 214 may comprise suitable logic, circuitry, and/or code that may be operable to exchange information in accordance with one or more communication standards. Exemplary communication standards supported by the I/O transceiver 214 may comprise USB, IEEE 1394, Wi-Fi, Wi-Max, infrared (IR), and/or Bluetooth.

For illustration, an exemplary scenario in which the device 102 is the network controller of the MoCA network will now be described.

The device 102 may power up, assume the role of network controller, and participate in message exchanges to authenticate and admit other devices to the MoCA network. In response to a discovery request received via the broadband transceiver 206, the device 102 may send one or more discovery responses indicating whether a password is required to be admitted to the MoCA network and/or indicating whether push-button configuration is enabled for the MoCA network.

In instances that push-button configuration is enabled, the device 102 may receive a discovery request from a new node desiring to be admitted to the MoCA network. The discovery request may be in response to a configuration button having been pressed on a new node. The device 102 may determine whether the discovery request was received within a determined amount of time of: (1) a pressing of the configuration button 214 of the device 102; or (2) a pressing of a configuration button on an existing node other than the device 102. In instances that the two button presses were within the determined amount of time, the device 102 may send a discovery response to the new node to enable the new node to determine the privacy password for being admitted to the MoCA network.

For illustration, an exemplary scenario in which the device 102 is a new node seeking admission to the MoCA network will now be described.

The device 102 may be configured to allow push button configuration or not. Changing whether the device 102 allows push-button configuration may require entering a password and/or clearing some other security hurdle. In instances that pushbutton configuration is disabled in the device 102, the processor 202 may ignore a user pushing the configuration button 214.

In instances that push-button configuration is enabled in the device 102, in response to a user pushing the configuration button 214, the device 102 may send a discovery request to the MoCA network. If the button press was within a determined amount of time of an existing node's configuration button being pressed, then the network controller of the MoCA network may send a discovery response to the device 102. The discovery response may enable the device 102 to determine the privacy password of the MoCA network. For example, the response may comprise the password encrypted utilizing the device 102's public key, and the device 102 may use its private key to recover the password. As another example, the response may comprise the password encrypted utilizing a shared key generated from a public key of the device 102 and a private key of the network controller; the device 102 may derive the shared key and utilize it to recover the password. The device 102 may then send, to the network controller, a start_admission request that was encrypted utilizing a key generated from the recovered password. The network controller may admit the device 102 to the network upon decrypting the start_admission request to verify that the key utilized to encrypt the start admission request was generated from the correct password.

Figure 3:
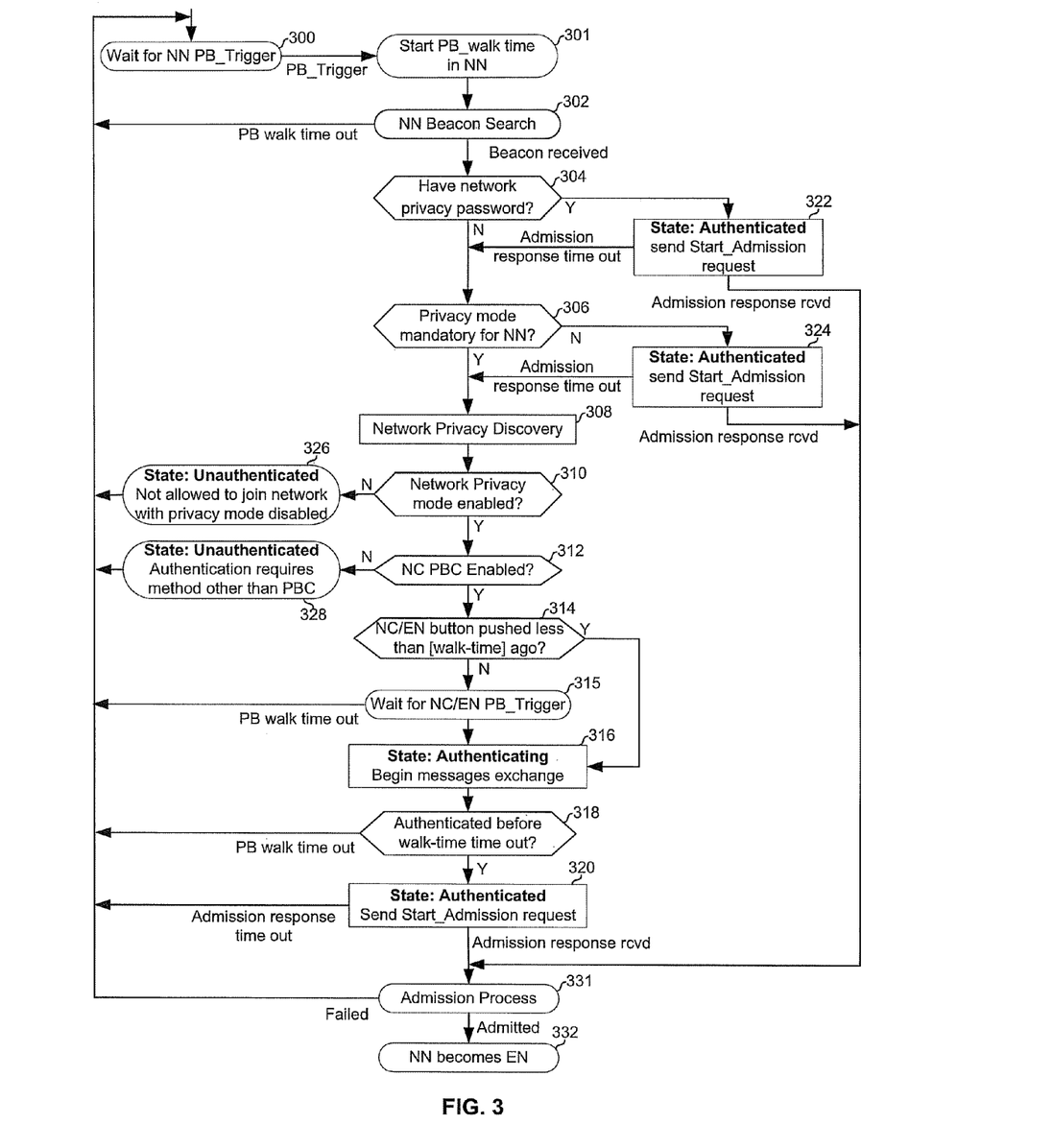
FIG. 3 is a flow chart illustrating exemplary steps for push button configuration of a MoCA device, in accordance with an embodiment of the invention.

FIG. 3 is a flow chart illustrating exemplary steps for push button configuration of a MoCA device, in accordance with an embodiment of the invention. Referring to FIG. 3, the exemplary steps begin with step 300 in which a new node 102C may wait for its configuration button to be pressed. Upon the configuration button of the node 102C being pushed, the steps may advance to step 301.

In step 301, a walk-time counter in the new node 102 may be initialized and begin counting. Subsequent to step 301, the exemplary steps may advance to step 302.

In step 302 the new node 102 may search for a beacon from a MoCA network controller. In instances that no beacon is received, then the exemplary steps may return to step 300. In instances that a beacon is received, the exemplary steps may advance to step 304.

In step 304, the new node 102 may determine whether it has a privacy password for the MoCA network. If the node 102 determines that it has a password, then the steps may advance to step 322.

In step 322, the new node 102 may transition to an authenticated state and attempt to gain admission to the MoCA network. This may comprise using the password to generate an encryption key, encrypting a start_admission request utilizing such a key, and transmitting the start_admission request to the network controller. If the password is correct, and the node 102 is admitted before a time out, the steps may advance to step 331. If the password is incorrect, a timeout may occur and the steps may advance to step 306.

In step 306, the new node 102 may determine whether it is configured such that it is permitted to be admitted to MoCA networks that do not require a password. If the new node 102 is permitted to access such a non-privacy-enabled network, then the steps may advance to step 324. In instances that the node 102 is not permitted to be admitted to non-privacy-enabled networks, the exemplary steps advance to step 308.

In step 324, the new node 102 may attempt to be admitted to the MoCA network without a password. If the new node 102 receives a response and is admitted before a time out, the steps may advance to step 331. If a timeout occurs without the node 102 being admitted to the network, then the steps advance to step 308.

In step 308, the new node 102 may begin exchanging messages with a network controller to discover characteristics of the MoCA network. Subsequent to step 308, the exemplary steps may advance to step 310.

In step 310, if the new node 102 discovers that privacy is not enabled on the MoCA network, then, in step 326, the node 102 may be prevented from being admitted to the network. The exemplary steps may then return to step 300. Alternatively, if the new node 102 discovers that privacy is enabled on the MoCA network, then the exemplary steps may advance to step 312.

In step 312, if the new node 102 discovers that push-button configuration is not enabled on network controller of the MoCA network, then, in step 328, the new node 102 may remain unauthenticated. If the new node 102 wants admission to the MoCA network, it will have to acquire the privacy password for the MoCA network in a way other than push-button configuration. For example, the new node 102 may have to be manually configured with the privacy password. Subsequent to step 328, the exemplary steps may return to step 300.

Returning to step 312, in instances that the network controller of the MoCA network does permit push-button configuration, the exemplary steps may advance to step 314.

In step 314, it may be determined whether the pushing of the configuration button in step 300 was within a walk time of the pushing of a configuration button on the network controller or other existing node. If so, then the exemplary steps may advance to step 316. If not, then the exemplary steps may advance to step 315.

In step 315, if a configuration button of the network controller or other existing node is not pushed before the walk-time counter of the new node 102 expires, the exemplary steps may return to step 300. If a configuration button of the network controller or other existing node is pushed before the walk-time counter of the new node 102 expires, the exemplary steps may advance to step 316.

In step 316, the node 102 may transition to an authenticating state, the new node 102 and the network controller may attempt to exchange messages to enable the new node 102 to determine the privacy password for the MoCA network. In instances that the walk-time counter in the new node 102 or the walk-time counter in the network controller reaches a determined value ("times out"), before the node 102 is authenticated, the steps may return to step 300. In instances that the node 102 is authenticated before the walk-time counter in the node 102 times out, the steps may advance to step 320.

In step 320, the node 102 may send a start_admission request to the network controller. This may comprise using the password to generate an encryption key, encrypting a start_admission request utilizing such a key, and transmitting the start_admission request to the network controller. In instances that the node 102 does not receive a response or is otherwise not admitted before a time out, the steps may return to step 300. In instances that the node 102 receives a response and is admitted before a time out, the steps may advance to step 331.

In step 331, the new node 102 and the network controller may participate in the process of admitting the new node 102. This process may comprise exchanging messages and/or other actions. In instances that the admission process fails, the exemplary steps may return to step 300. In instances that the admission process is successful, the exemplary steps may advance to step 332.

In step 332, the node 102 may be admitted to the MoCA network and may be an "existing node" and no longer a "new node."

Figure 4A:
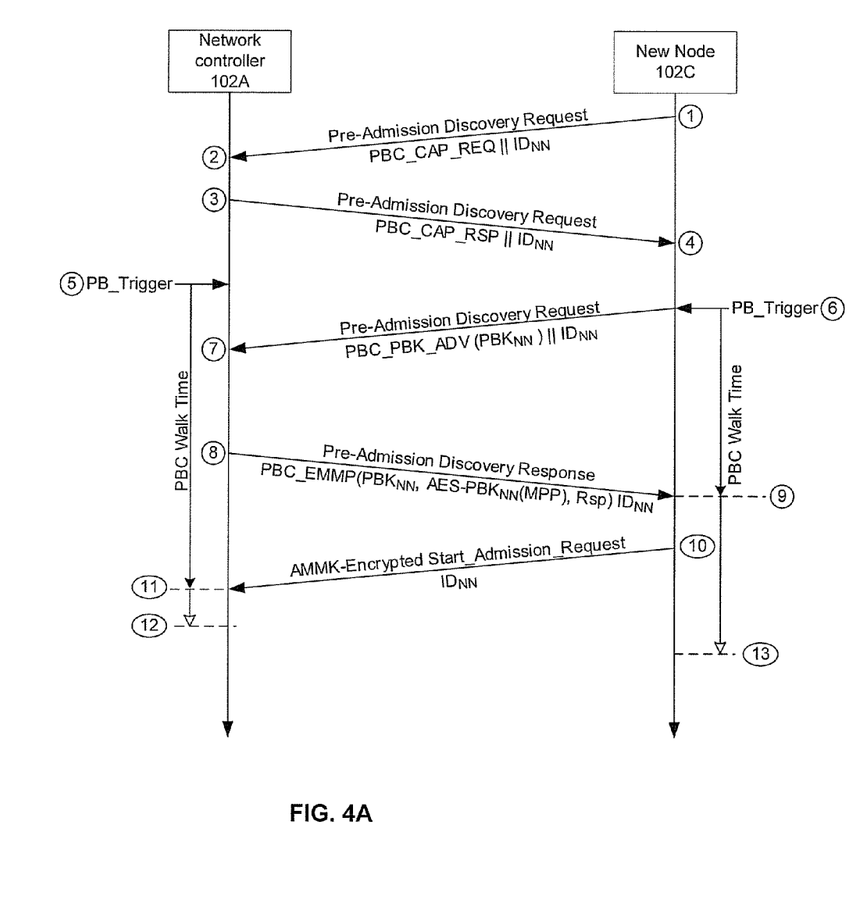
FIG. 4A is a diagram illustrating an exemplary exchange of messages for push-button configuration of a MoCA device, in accordance with an embodiment of the invention.

FIG. 4A is a diagram illustrating an exemplary exchange of messages for push-button configuration of a MoCA device, in accordance with an embodiment of the invention. Referring to FIG. 4A, there is shown an exchange of messages between the node 102C which is a new node to a MoCA network, and the node 102A which is the network controller of the MoCA network. At time instant 1 (indicated by the encircled '1'), the node 102C sends a pre-admission discovery request to the node 102C. The request sent at time instant 1 is a request for the privacy capabilities and/or configuration of MoCA network. The request includes the unique identifier, $ID_{102C}$, of the node 102C. The request may be received by the node 102A at time instant 2.

In response to the request received at time instant 2, the node 102A may transmit a pre-admission discovery response at time instant 3. The response may indicate the privacy capabilities and/or configuration of the MoCA network. The response may indicate whether privacy mode is enabled on the MoCA network, that is, whether a password is required. The response may also indicate whether push-button configuration is supported. The response may include $ID_{102C}$. The response may be received by the node 102C at time instant 4.

At time instant 5, a configuration button on the node 102A may be pushed. The pushing of the configuration may cause a walk-time counter in the node 102A to be initialized and begin counting.

At time instant 6, a configuration button of the node 102C may be pushed. In response to the pushing of the configuration button, a walk-time counter in the node 102C may be initialized and begin counting. The pressing of the configuration button may also cause the node 102C to generate and transmit a pre-admission discovery request at time instant 6. The request may include an advertisement of a public key of the node 102C, and may include $ID_{102C}$. The request may be receive at the node 102A at time instant 7.

In response to the request received at time instant 7, the node 102A may encrypt the privacy password of the MoCA network utilizing the received public key. At time instant 8, the node 102A may transmit a pre-admission discovery response comprising the encrypted privacy password. The response may be received at the node 102C at time instant 9.

As a result of the response received at time instant 9, the node 102C may transition to an authenticating state. The node 102C may use its private key to decrypt the response and recover the password. Receipt of the password may stop the walk-time counter in the node 102C before it times out at time instant 13.

At time instant 10, the node 102C generates and transmits a start_admission request to be admitted to the MoCA network. The start_admission request may be encrypted utilizing a key generated from the password recovered at time instant 9. The start_admission request may be received by the node 102A at time instant 11.

Upon receiving the start_admission request the network controller may attempt to decrypt the start_admission request utilizing a key generated from the privacy password of the MoCA network. If the password utilized in encrypting the start_admission request was correct, then the result of the decryption should be a message that the network controller recognizes as a valid start_admission request, and a procedure for admitting the node 102C to the MoCA network may begin. Receipt of the start_admission request may stop the walk-time counter in the node 102A before it times out at time instant 12.

Figure 4B:
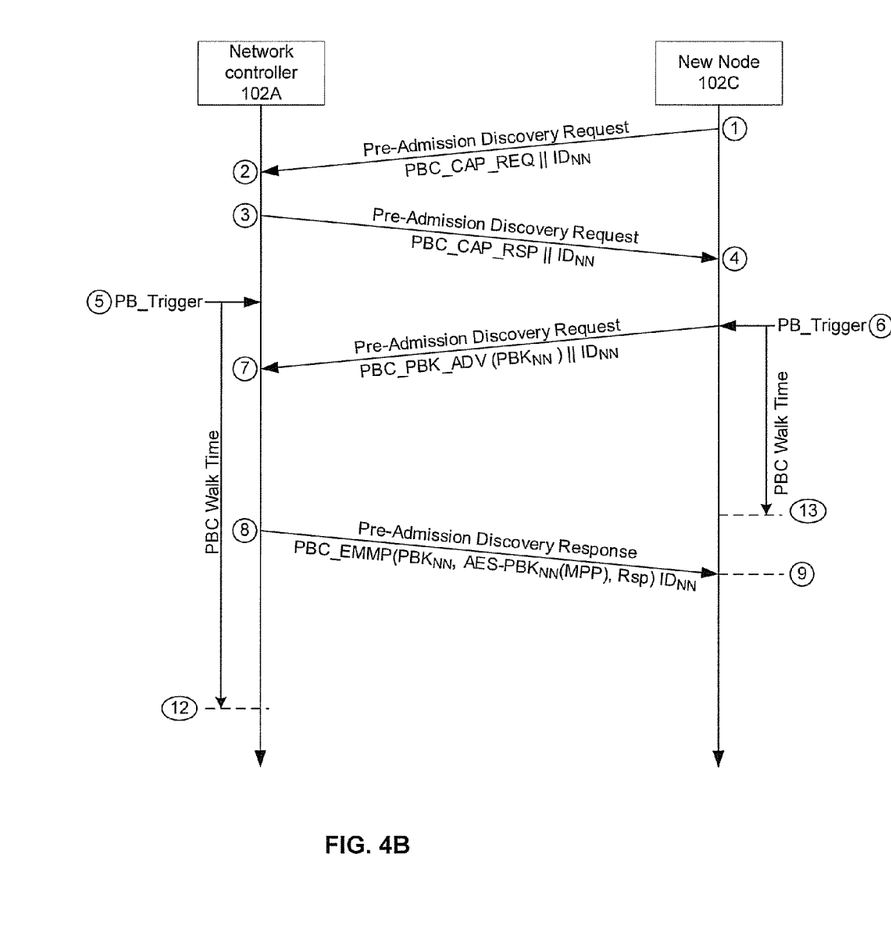
FIG. 4B is a diagram illustrating an exemplary exchange of messages for push-button configuration of a MoCA device, in accordance with an embodiment of the invention.

FIG. 4B is a diagram illustrating an exemplary exchange of messages for push-button configuration of a MoCA device, in accordance with an embodiment of the invention. Referring to FIG. 4B, the exchange is similar to the exchange in FIG. 4A except time instant 9 is after the walk-time counter in the node 102C has timed out at time instant 13. Consequently, the node 102C is not authenticated to the MoCA network.

Figure 4C:
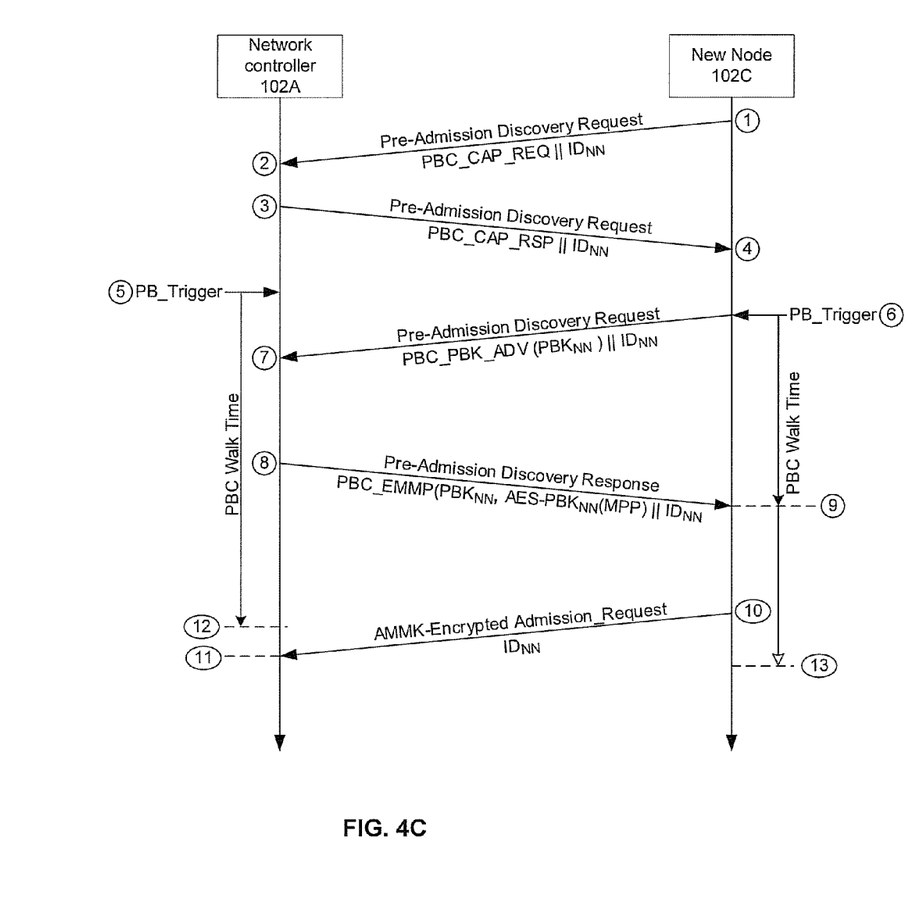
FIG. 4C is a diagram illustrating an exemplary exchange of messages for push-button configuration of a MoCA device, in accordance with an embodiment of the invention.

FIG. 4C is a diagram illustrating an exemplary exchange of messages for push-button configuration of a MoCA device, in accordance with an embodiment of the invention. Referring to FIG. 4C, the exchange is similar to the exchange in FIG. 4A except the start_admission request doesn't arrive until after the walk-time counter in the node 102A times out at time instant 12. Consequently, the node 102C is not admitted to the MoCA network.

Figure 5A:
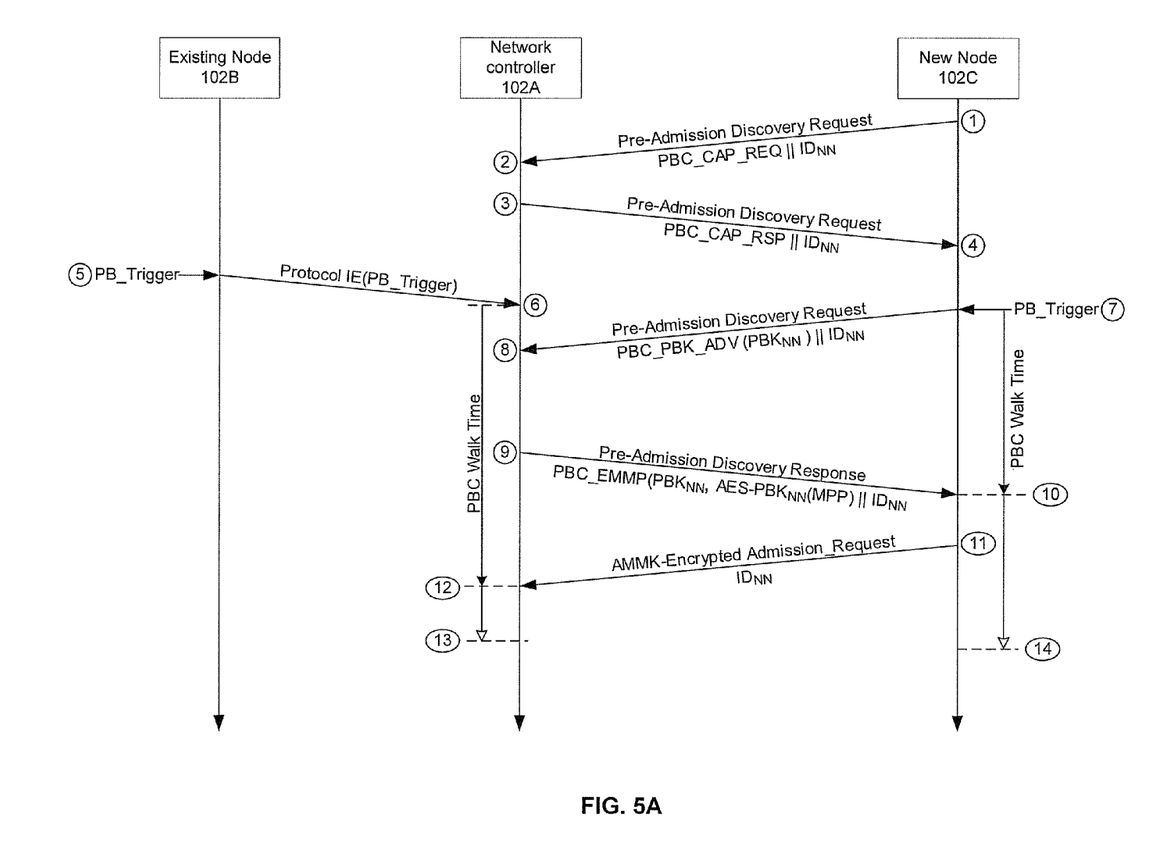
FIG. 5A is a diagram illustrating an exemplary exchange of messages for push-button configuration of a MoCA device, in accordance with an embodiment of the invention.

FIG. 5A is a diagram illustrating an exemplary exchange of messages for push-button configuration of a MoCA device, in accordance with an embodiment of the invention. Referring to FIG. 5A, there is shown an exchange of messages between the node 102C which is a new node to a MoCA network, the node 102A which is the network controller of the MoCA network, and the node 102B which is an existing node on the MoCA network. At time instant 1 (indicated by the encircled '1'), the node 102C sends a pre-admission discovery request to the node 102C. The request sent at time instant 1 is a request for the privacy capabilities and/or configuration of MoCA network. The request includes the unique identifier, $ID_{102C}$, of the node 102C. The request may be received by the node 102A at time instant 2.

In response to the request received at time instant 2, the node 102A may transmit a pre-admission discovery response at time instant 3. The response may indicate the privacy capabilities and/or configuration of the MoCA network. The response may indicate whether privacy mode is enabled on the MoCA network, that is, whether a password is required. The response may also indicate whether push-button configuration is supported. The response may include $ID_{102C}$. The response may be received by the node 102C at time instant 4.

At time instant 5, in one embodiment of the invention, a configuration button on the node 1028 is pushed. In response, the node 102B may send a reservation request comprising a Protocol IE (a "PB_trigger" Protocol IE) that indicates the configuration button on the node 102B has been pushed. The reservation request comprising the PB_Trigger Protocol IE arrives at the node 102A at time instant 6. The receipt of the PB_Trigger Protocol IE at time instant 6 may trigger a walk-time counter in the node 102A to be initialized and begin counting.

At time instant 5, in another embodiment of the invention, at time instant 5, a configuration button on the node 102B is pushed. In response, the node 102B may generate a layer 2 management entity (L2ME) message that indicates the configuration button of the node 102B has been pressed. The L2ME message arrives at the node 102A at time instant 6. The receipt of the L2ME message at time instant 6 may trigger a walk-time counter in the node 102A to be initialized and begin counting.

At time instant 7, a configuration button of the node 102C may be pushed. In response to the pushing of the configuration button, a walk-time counter in the node 102C may be initialized and begin counting. The pressing of the configuration button may also cause the node 102C to generate and transmit a pre-admission discovery request at time instant 7. The request may include an advertisement of a public key of the node 102C, and may include $ID_{102C}$. The request may be receive at the node 102A at time instant 8.

In response to the discovery request being received at time instant 8 before the walk-time counter in the node 102A has timed out, the node 102A may, at time instant 9, encrypt the privacy password of the MoCA network utilizing the received public key and transmit a pre-admission discovery response comprising the encrypted privacy password. The response may be received at the node 102C at time instant 10.

As a result of the response received at time instant 10, the node 102C may transition to an authenticating state. The node 102C may use its private key to decrypt response and recover the password. Receipt of the password may stop the walk-time counter in the node 102C before it times out at time instant 14.

At time instant 11, the node 102C generates and transmits a request to be admitted to the MoCA network. The start_admission request may be encrypted utilizing a key generated from the password recovered at time instant 10. The start admission request may be received by the node 102A at time instant 12.

Upon receiving the start_admission request the network controller may attempt to decrypt the start_admission request utilizing a key generated from the privacy password of the MoCA network. If the password utilized in encrypting the start_admission request was correct, then the result of the decryption should be a valid start_admission request, and a procedure for admitting the node 102C to the MoCA network may begin. Receipt of the start_admission request may stop the walk-time counter in the node 102A at time instant 10, before it times out at time instant 13.

Figure 5B:
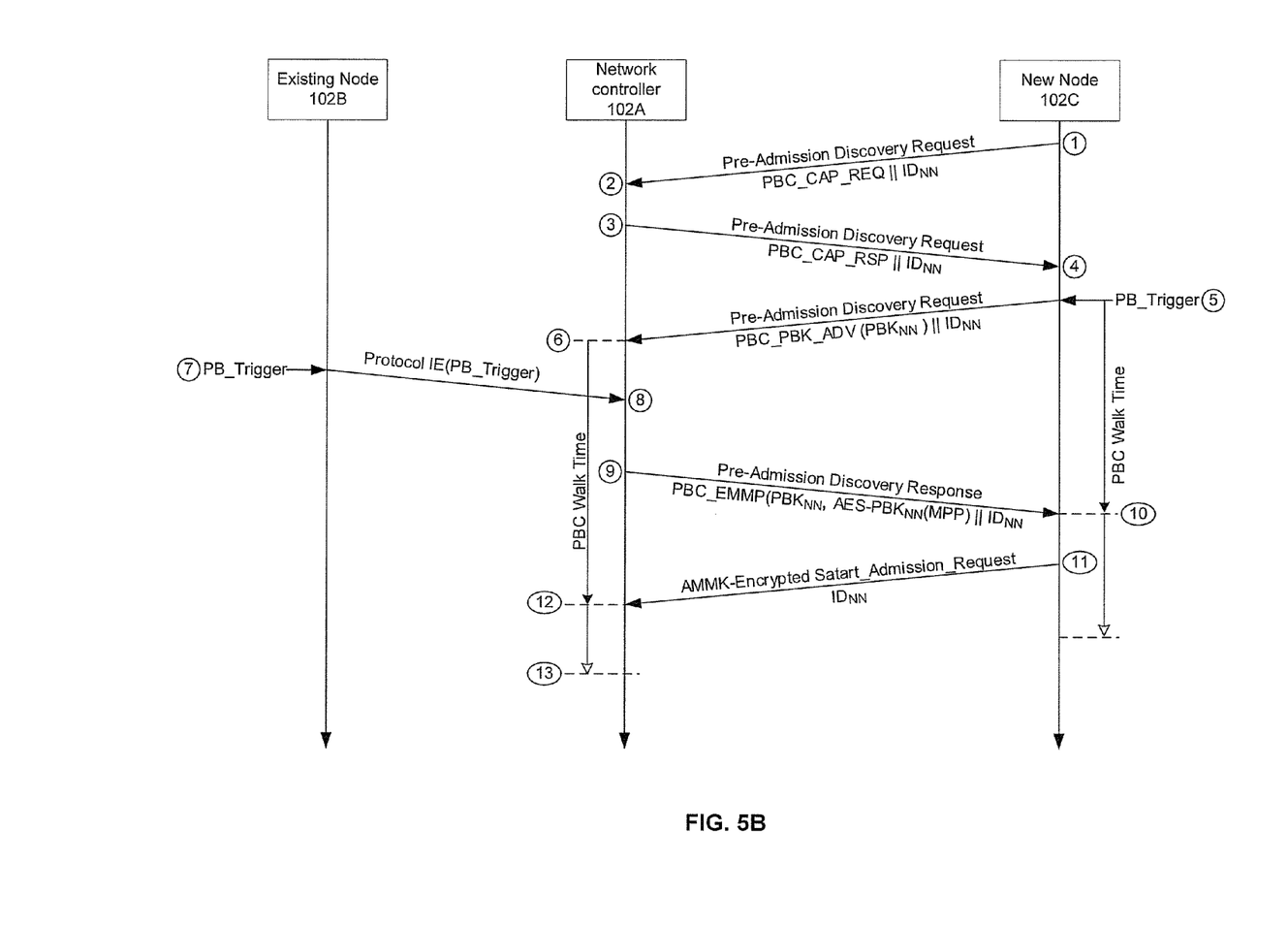
FIG. 5B is a diagram illustrating an exemplary exchange of messages for push-button configuration of a MoCA device, in accordance with an embodiment of the invention.

FIG. 5B is a diagram illustrating an exemplary exchange of messages for push-button configuration of a MoCA device, in accordance with an embodiment of the invention. Referring to FIG. 5B, there is shown an exchange of messages between the node 102C which is a new node to a MoCA network, the node 102A, which is the network controller of the MoCA network, and the node 102B which is an existing node on the MoCA network. At time instant 1 (indicated by the encircled '1'), the node 102C sends a pre-admission discovery request to the node 102C. The request sent at time instant 1 is a request for the privacy capabilities and/or configuration of MoCA network. The request includes the unique identifier, $ID_{102C}$, of the node 102C. The request may be received by the node 102A at time instant 2.

In response to the request received at time instant 2, the node 102A may transmit a pre-admission discovery response at time instant 3. The response may indicate the privacy capabilities and/or configuration of the MoCA network. The response may indicate whether privacy mode is enabled on the MoCA network, that is, whether a password is required. The response may also indicate whether push-button configuration is supported. The response may include $ID_{102C}$. The response may be received by the node 102C at time instant 4.

At time instant 5, a configuration button of the node 102C may be pushed. In response to the pushing of the configuration button, at time instant 5, a walk-time counter in the node 102C may be initialized and begin counting. The pressing of the configuration button may also cause the node 102C to generate and transmit a preadmission discovery request. The request may include an advertisement of a public key of the node 102C, and may include $ID_{102C}$. The request may be received at the node 102A at time instant 6.

At time instant 7, in an embodiment of the invention, a configuration button on the node 102B is pushed. In response, the node 102B may send a reservation request comprising a Protocol IE (a "PB_Trigger" Protocol IE) that indicates the configuration button on the node 102B has been pushed. The reservation request comprising the PB_Trigger Protocol IE arrives at the node 102A at time instant 8. The receipt of the PB_Trigger Protocol IE at time instant 8 may trigger a walk-time counter in the node 102A to be initialized and begin counting.

At time instant 7, in another embodiment of the invention, a configuration button on the node 102B is pushed. In response, the node 102B may generate a L2ME message that indicates the configuration button of the node 102B has been pressed (a "PBTrigger" L2ME). The L2ME message arrives at the node 102A at time instant 8. The receipt of the L2ME message at time instant 8 may trigger a walk-time counter in the node 102A to be initialized and begin counting.

In response to receiving the PB_Trigger L2ME or Protocol IE from device 102B before the walk-time counter in the node 102A has timed out the node 102A may, at time instant 9, encrypt the privacy password of the MoCA network utilizing the received public key and transmit a pre-admission discovery response comprising the encrypted privacy password. The response may be received at the node 102C at time instant 10.

As a result of the response received at time instant 10, the node 102C may transition to an authenticating state. The node 102C may use its private key to decrypt response and recover the password. Receipt of the password may stop the walk-time counter at time instant 10, before it times out at time instant 14.

At time instant 11, the node 102C generates and transmits a request to be admitted to the MoCA network. The start_admission request may be encrypted utilizing a key generated from the password recovered at time instant 10. The start_admission request may be received by the node 102A at time instant 12.

Upon receiving the start_admission request, the network controller may attempt to decrypt the start_admission request utilizing a key generated from the privacy password of the MoCA network. If the password utilized to generate the encryption key was correct, then the result of the decryption should be a message that the network controller recognizes as a valid start_admission request, and a procedure for admitting the node 102C to the MoCA network may begin. Receipt of the start_admission request may stop the walk-time counter at time instant 12, before it times out at time instant 13.

Figure 6:
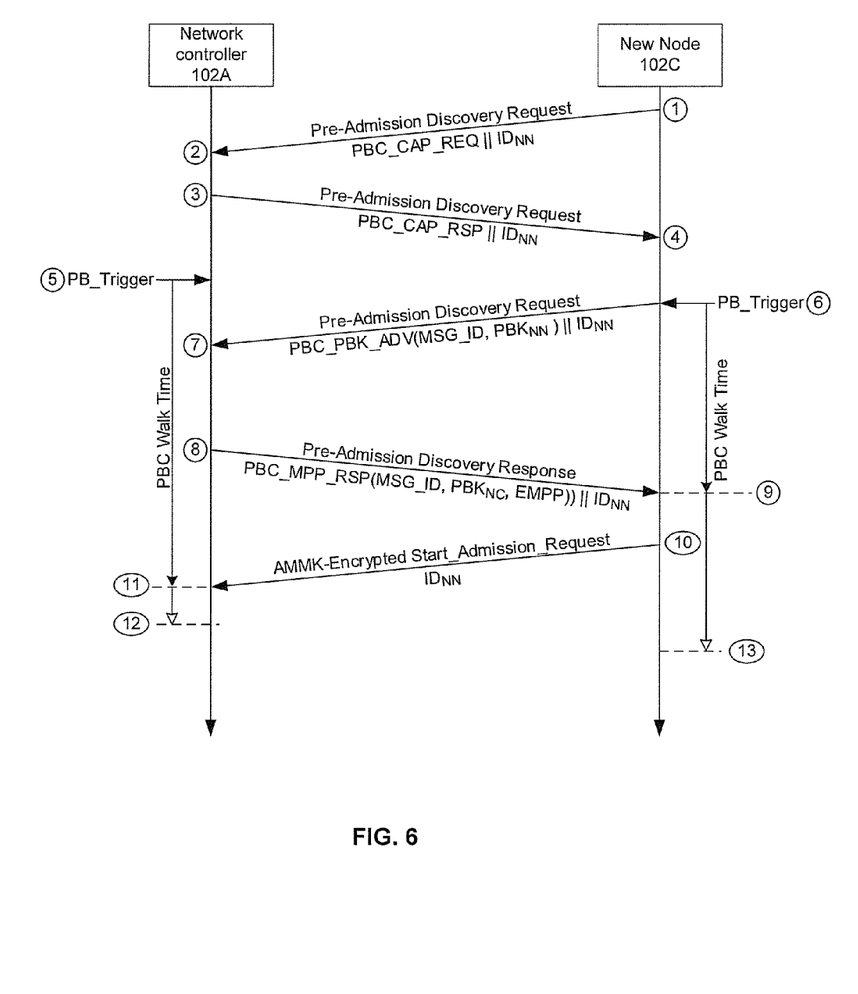
FIG. 6 is a diagram illustrating an exemplary exchange of messages for push-button configuration of a MoCA device, in accordance with an embodiment of the invention.

FIG. 6 is a diagram illustrating an exemplary exchange of messages for push-button configuration of a MoCA device, in accordance with an embodiment of the invention. In FIG. 6, the communication of the privacy password to the new node 102C in encrypted utilizing a shared key generated from a public key of the new node 102C and a private key of network controller 102A. The new node 102C is able to derive the shared key utilizing a public key of the network controller 102A and its own private key.

Referring to FIG. 6, there is shown an exchange of messages between the node 102C which is a new node to a MoCA network, and the node 102A which is the network controller of the MoCA network. At time instant 1 (indicated by the encircled '1'), the node 102C sends a pre-admission discovery request to the node 102C. The request sent at time instant 1 is a request for the privacy capabilities and/or configuration of MoCA network. The request includes the unique identifier, $ID_{102C}$, of the node 102C. The request may be received by the node 102A at time instant 2.

In response to the request received at time instant 2, the node 102A may transmit a pre-admission discovery response at time instant 3. The response may indicate the privacy capabilities and/or configuration of the MoCA network. The response may indicate whether privacy mode is enabled on the MoCA network, that is, whether a password is required. The response may also indicate whether push-button configuration is supported. The response may include $ID_{102C}$. The response may be received by the node 102C at time instant 4.

At time instant 5, a configuration button on the node 102A may be pushed. The pushing of the configuration may cause a walk-time counter in the node 102A to be initialized and begin counting.

At time instant 6, a configuration button of the node 102C may be pushed. In response to the pushing of the configuration button, a walk-time counter in the node 102C may be initialized and begin counting. The pressing of the configuration button may also cause the node 102C to generate and transmit a pre-admission discovery request at time instant 6. The request may include an advertisement of a public key of the node 102C, a unique identifier of the request (MSG_ID), and may include $ID_{102C}$. The request may be receive at the node 102A at time instant 7.

In response to the request received at time instant 7, the node 102A may encrypt the privacy password of the MoCA network utilizing a shared key generated from the received public key of the device 102C and a private key of the device 102A. At time instant 8, the node 102A may transmit a pre-admission discovery response comprising the unique message identifier (MSG_ID), a public key of the device 102A, and the encrypted privacy password (EMPP). The response may be received at the node 102C at time instant 9.

As a result of the response received at time instant 9, the node 102C may transition to an authenticating state. The node 102C may generate the shared key based on the received public key of the device 102A and its own private key. The node 102C may utilize the shared key to decrypt the response and recover the password. Receipt of the password may stop the walk-time counter in the node 102C before it times out at time instant 13.

At time instant 10, the node 102C generates and transmits a start_admission request to be admitted to the MoCA network. The start_admission request may be encrypted utilizing a key generated from the password recovered at time instant 9. The start_admission request may be received by the node 102A at time instant 11.

Upon receiving the start_admission request the network controller may attempt to decrypt the start_admission request utilizing a key generated from the privacy password of the MoCA network. If the password utilized in encrypting the start_admission request was correct, then the result of the decryption should be a message that the network controller recognizes as a valid start_admission request, and a procedure for admitting the node 102C to the MoCA network may begin. Receipt of the start_admission request may stop the walk-time counter in the node 102A before it times out at time instant 12.

Various aspects of a method and system for push-button configuration of a MoCA network are provided. A first device 102A coupled to a multimedia over coax alliance (MoCA) network via coaxial cabling 104 may receive, from a second device 102C, a message requesting information that indicates whether the MoCA network supports push-button configuration. In response to the received message, the first device 102A may transmit a response to the second device 102C, the response may indicate whether push-button configuration is supported by the MoCA network.

The first device 102A may receive, from the second device 102C via the coaxial cabling 104, an indication that a configuration button on the second device 102C has been activated. The first device 102A may receive, from a third device 102B via the coaxial cabling 104, an indication that a configuration button on the third device 102B has been activated. The indication from the third device 102B may comprise a layer 2 management entity (L2ME) message or a Protocol Information Element (Protocol IE).

The first device 102A may determine whether to allow the second device 102C to be authenticated on the MoCA network based on a time interval between when the configuration button of the second device 102C was activated and when the configuration button of the third device 102B was activated. The first device 102A may allow the second device to be authenticated on the MoCA network when the configuration button of the second device and the configuration button of the third device are both activated within the time interval. The first device 102A may prevent the second device 102C from being authenticated on the MoCA network when the configuration button of the second device 102C and the configuration button of the third device are not both activated within the time interval. After deciding to allow the second device to be authenticated, the first device 102A may send a message to the second device 102C, wherein the message may comprise information that enables the second device 102C to determine a privacy password of the MoCA network.

The indication from the second device 102C may comprise a discovery request. The first device 102A may ignore the discovery request when the configuration button of the second device 102C and the configuration button of the third device 102B are not both activated within the time interval. The first device 102A may transmit a response to the discovery request when the configuration button of the second device 102C and the configuration button of the third device 102B are both activated within the time interval. The response may comprise information enabling the second device 102B to determine a privacy password of the MoCA network. After transmitting the response, the first device 102A may receive a start_admission request from the second device 102C, wherein the start_admission request may be encrypted utilizing a key generated from the privacy password. The first device 102A may admit the second device 102C to the MoCA network if: the start_admission request was encrypted utilizing the correct password, and the start_admission request is received within a determined amount of time of the activation of the configuration button on the third device 102B.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for push button configuration of multimedia over coax alliance (MoCA) Devices Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
   receiving, by a first device from a second device, a message requesting information that indicates whether a multimedia over coax alliance (MoCA) network supports push-button configuration, the first device configured to communicate with the second device and a third device via the MoCA network;
   in response to the received message, transmitting a response to the second device, the response indicating whether push-button configuration is supported by the MoCA network;
   determining, by a first device configured to communicate with a second device and a third device via a multimedia over coax alliance (MoCA) network, that a configuration button on the second device has been activated;
   determining, by the first device, whether a configuration button has been activated on the first device or the third device within a time interval from a time at which the configuration button on the second device is activated;
   in response to determining that the configuration button has been activated on the first device within the time interval, allowing, by the first device, the second device to be authenticated on the MoCA network;
   in response to determining that the configuration button has been activated on the third device within the time interval, allowing, by the first device, the second device to be authenticated on the MoCA network; and
   in response to determining that the configuration button has not been activated on either the first device or the third device within the time interval, preventing, by the first device, admission of the second device to the MoCA network.

2. The method of claim 1, further comprising, after determining to allow the second device to be authenticated, sending a message to the second device, wherein the message comprises information usable by the second device to determine a privacy password of the MoCA network.

3. The method of claim 1, wherein determining the configuration button has been activated on the third device comprises receiving, at the first device, an indication from the third device that the configuration button has been activated on the third device.

4. The method of claim 3, wherein the indication from the third device comprises a layer 2 management entity (L2ME) message or a Protocol Information element.

5. The method of claim 1, wherein determining that the configuration button on the second device has been activated comprises receiving, at the first device, a discovery request from the second device.

6. The method of claim 5, further comprising:
   ignoring the discovery request when the configuration button on the second device and the configuration button on either the first device or the third device are not both activated within the time interval; and
   transmitting a response to the discovery request when the configuration button on the second device and the configuration button on either the first device or the third device are both activated within the time interval.

7. The method of claim 6, wherein the response comprises information usable by the second device to determine a privacy password of the MoCA network.

8. The method of claim 7, further comprising: after transmitting the response, receiving an encrypted message from the second device; decrypting the received encrypted message utilizing a key generated from the privacy password; admitting the second device to the MoCA network if: the message is received within a determined amount of time of the activation of the configuration button on either the first device or the third device; and decryption results in recovery of a valid start admission request from the received message.

9. A system comprising:
one or more circuits for use in a first device configured to communicate with a second device and a third device via a wired network, the one or more circuits configured to:
receive, the second device, a message requesting information that indicates whether the wired network supports push-button configuration;
in response to the received message, transmit a response to the second device, the response indicating whether push-button configuration is supported by the wired network;
determine that a configuration button on the second device has been activated;
determine whether a configuration button has been activated on the first device or the third device within a time interval from a time at which the configuration button on the second device is activated;
in response to determining that the configuration button has been activated on the first device within the time interval, allowing, by the first device, the second device to be authenticated on the wired network;
in response to determining that the configuration button has been activated on the third device within the time interval, allowing, by the first device, the second device to be authenticated on the wired network; and
in response to determining that the configuration button has not been activated on either the first device or the third device within the time interval, prevent admission of the second device to the wired network.

10. The system of claim 9, wherein the wired network comprises a coaxial cable network.

11. The system of claim 10, wherein the wired network comprises a multimedia over coax alliance (MoCA) network.

12. The system of claim 9, wherein the one or more circuits are configured to, after determining to allow the second device to be authenticated, send a message to the second device, wherein the message comprises information usable by the second device to determine a privacy password of the wired network.

13. The system of claim 9, wherein the one or more circuits are configured to determine the configuration button has been activated on the third device by receiving an indication from the third device that the configuration button has been activated on the third device.

14. The system of claim 13, wherein the indication from the third device comprises a layer 2 management entity (L2ME) message or a Protocol Information Element.

15. The system of claim 9, wherein the one or more circuits are configured to determine the configuration button on the second device has been activated by receiving a discovery request from the second device.

16. The system of claim 15, wherein the one or more circuits are configured to: ignore the discovery request when the configuration button on the second device and the configuration button on either the first device or the third device are not both activated within the time interval; and transmit a response to the discovery request when the configuration button on the second device and the configuration button on either the first device or the third device are both activated within the time interval.

17. The system of claim 16, wherein the response comprises information usable by the second device to determine a privacy password of the wired network.

18. The system of claim 17, wherein the one or more circuits are configured to: after transmitting the response, receive an encrypted message from the second device; decrypt the received encrypted message utilizing a key generated from the privacy password; and admit the second device to the wired network if: the message is received within a determined amount of time of the activation of the configuration button on either the first device or the third device; and description results in recovery of a valid start admission request from the received message.

* * * * *